(12) United States Patent
Jo et al.

(10) Patent No.: US 10,728,453 B2
(45) Date of Patent: Jul. 28, 2020

(54) MOTION STABILIZED IMAGE SENSOR, CAMERA MODULE AND APPARATUS COMPRISING SAME

(71) Applicant: SAMSUNG ELECTRONICS CO., LTD., Suwon-si (KR)

(72) Inventors: Young Mi Jo, Hwaseong-si (KR); Hoe Won Kim, Suwon-si (KR); Chae Sung Kim, Seoul (KR); Jae Sung Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 15/498,978

(22) Filed: Apr. 27, 2017

(65) Prior Publication Data

US 2018/0041704 A1 Feb. 8, 2018

(30) Foreign Application Priority Data

Aug. 3, 2016 (KR) .......................... 10-2016-0099087
Sep. 21, 2016 (KR) .......................... 10-2016-0120892

(51) Int. Cl.
*H04N 5/232* (2006.01)
*H04N 5/14* (2006.01)

(52) U.S. Cl.
CPC ..... *H04N 5/23258* (2013.01); *H04N 5/23267* (2013.01); *H04N 5/144* (2013.01)

(58) Field of Classification Search
CPC . H04N 5/23258; H04N 5/23267; H04N 5/144
See application file for complete search history.

(56) References Cited

U.S. PATENT DOCUMENTS

| | | | |
|---|---|---|---|
| 7,502,560 B2 | 3/2009 | Komori | |
| 7,680,402 B2 | 3/2010 | Chujo et al. | |
| 7,796,872 B2 | 9/2010 | Sachs et al. | |
| 8,593,541 B2 | 11/2013 | Pinto et al. | |
| 9,292,102 B2 | 3/2016 | Nasiri et al. | |
| 10,091,432 B2 * | 10/2018 | Mukunashi | .......... H04N 5/2353 |

(Continued)

FOREIGN PATENT DOCUMENTS

| | | |
|---|---|---|
| JP | 3101589 B2 | 10/2000 |
| KR | 10-2016-0044945 A | 4/2016 |
| KR | 1020170062164 A | 6/2017 |

*Primary Examiner* — Antoinette T Spinks
(74) *Attorney, Agent, or Firm* — Sughrue Mion, PLLC (57) ABSTRACT

An image sensor includes: an image obtainer configured to generate image information by converting received light into an electrical signal; a first detector configured to detect first time information regarding a first time at which the image obtainer acquires the image information; a second detector configured to receive a plurality of pieces of movement information indicating movements of the image obtainer, and detecting second time information regarding a second time at which at least one piece of movement information among the plurality of pieces of movement information is received. A single port is configured to output the image information, the first time information, output movement information selected from among the plurality of pieces of movement information, and the second time information regarding the selected output movement information.

18 Claims, 7 Drawing Sheets

(56) References Cited

U.S. PATENT DOCUMENTS

| | | |
|---|---|---|
| 2005/0248660 A1* | 11/2005 | Stavely .................. G03B 39/00 |
| | | 348/208.16 |
| 2008/0231714 A1 | 9/2008 | Estevez et al. |
| 2013/0044228 A1 | 2/2013 | Corey et al. |
| 2013/0321657 A1* | 12/2013 | McGarry ............. H04N 5/2327 |
| | | 348/220.1 |
| 2014/0307110 A1 | 10/2014 | Liu |
| 2014/0362256 A1* | 12/2014 | Schulze ............. H04N 5/23277 |
| | | 348/231.99 |
| 2015/0341531 A1 | 11/2015 | Senda |
| 2016/0057352 A1 | 2/2016 | Yoneda et al. |
| 2016/0112640 A1 | 4/2016 | Hasan et al. |
| 2017/0155843 A1 | 6/2017 | Yoo |

* cited by examiner

MOTION STABILIZED IMAGE SENSOR, CAMERA MODULE AND APPARATUS COMPRISING SAME

CROSS-REFERENCE TO RELATED APPLICATIONS

This application claims priority from Korean Patent Application No. 10-2016-0099087, filed on Aug. 3, 2016 and Korean Patent Application No. 10-2016-0120892, filed on Sep. 21, 2016 in the Korean Intellectual Property Office, the disclosures of which are incorporated herein by reference in their entireties.

BACKGROUND

1. Field

Methods and apparatuses consistent with example embodiments relate to an image sensor, a camera module and an apparatus including the same.

2. Description of Related Art

Camera modules including image sensors are commonly mounted in apparatuses used within a range of fields, such as mobile devices, drones, digital cameras, wearable devices, and automobiles. When images are obtained using image sensors, if camera modules including image sensors or apparatuses including camera modules move, the quality of images obtained therewith may be degraded. In particular, camera modules installed in apparatuses that frequently move may generate images with increased degradation due to movements thereof. Therefore, processes of correcting images obtained by image sensors need to be performed, in order to compensate for the movements of camera modules or apparatuses.

SUMMARY

One or more example embodiments provide an image sensor, a camera module and an apparatus able to compensate for movements more precisely.

According to an aspect of an example embodiment, there is provided an image sensor including: an image obtainer configured to generate image information by converting received light into an electrical signal; a first detector configured to detect first time information regarding a first time at which the image obtainer acquires the image information; a second detector configured to receive a plurality of pieces of movement information indicating movements of the image obtainer, and detect second time information regarding a second time at which at least one piece of movement information among the plurality of pieces of movement information is received; and a single port configured to output the image information, the first time information, output movement information selected from among the plurality of pieces of movement information, and the second time information regarding the output movement information.

According to an aspect of another example embodiment, there is provided an image sensor including: an image obtainer configured to generate image information by converting received light into an electrical signal based on a plurality of control signals; a first detector configured to output the plurality of control signals, and detect first time information regarding a first time at which the image obtainer acquires the image information using at least one among the plurality of control signals; a second detector configured to receive a plurality of pieces of movement information indicating movements of the image obtainer, and detect second time information regarding a second time at which at least one piece of movement information among the plurality of pieces of movement information is received; and an output interface configured to output the image information, the first time information, the at least one piece of movement information, and the second time information.

According to an aspect of yet another example embodiment, there is provided a camera module including: an optical unit including a plurality of lenses; a movement sensor configured to detect movement and generate a plurality of pieces of movement information based on the detected movement; and an image sensor configured to generate image information by converting light received through the optical unit into an electrical signal, receive the plurality of pieces of movement information; and output, through a single port, the image information, first time information, information regarding a first time at which the image information is obtained, at least one piece of movement information among the plurality of pieces of movement information, and second time information regarding a second time at which the at least one piece of movement information is received.

According to yet another example embodiment, there is provided a camera module including: an optical unit including a plurality of lenses; a movement sensor configured to detect movement and output a plurality of pieces of movement information based on the detected movement; and an image sensor configured to generate image information by converting light received through the optical unit into an electrical signal based on a plurality of control signals, receive the plurality of pieces of movement information, detect first time information regarding a first time at which the image information is obtained; and output the image information, the first time information, at least one piece of movement information, and second time information regarding a second time at which the at least one piece of movement information is received.

According to still yet another example embodiment, there is provided an apparatus including: a camera module including: an optical unit including a plurality of lenses; a movement sensor configured to output a plurality of pieces of movement information based on detected movements; and an image sensor configured to generate image information by converting light received through the optical unit into an electrical signal, receive the plurality of pieces of movement information, and output, through a single port, the image information, first time information regarding a first time at which the image information is obtained, at least one piece of movement information among the plurality of pieces of movement information, and second time information regarding a second time at which the at least one piece of movement information is received; and a processor configured to receive the image information, the first time information, the at least one piece of movement information, and the second time information, and modify the image information using the first time information, the at least one piece of movement information, and the second time information.

According to another example embodiment, there is provided an image compensation method of an imaging device, the image compensation method including: generating image information based on received light; detecting first time information regarding a first time at which the image information is generated; sensing a movement of the imaging device; detecting second time information regarding a second time at which the movement is sensed; and generating compensated image data based on the generated image information, the first time information, the movement, and the second time information. According to still another example embodiment, there is provided a non-transitory computer readable recording medium having embodied thereon a program, which when executed by a processor causes the processor to execute an image compensation method, the image compensation method including: generating image information based on received light; detecting first time information regarding a first time at which the image information is generated; sensing a movement of the imaging device; detecting second time information regarding a second time at which the movement is sensed; and generating compensated image data based on the generated image information, the first time information, the movement, and the second time information.

BRIEF DESCRIPTION OF DRAWINGS

The above, and other aspects, features, and advantages of the present disclosure will be more clearly understood from the following detailed description when taken in conjunction with the accompanying drawings, in which.

DETAILED DESCRIPTION

Figure 1:
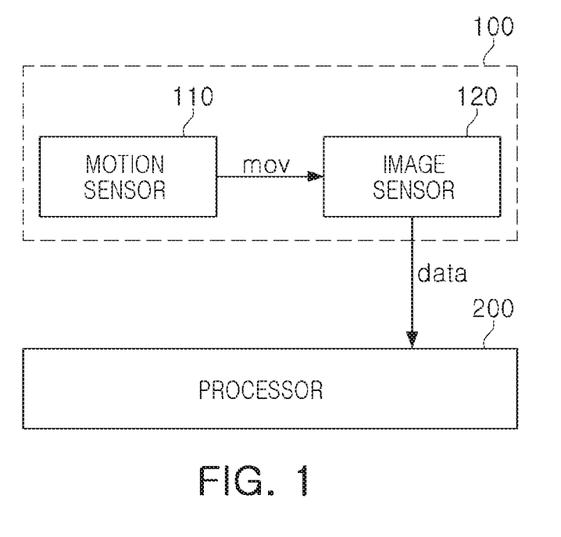
FIG. 1 is a block diagram illustrating a configuration of an apparatus according to an example embodiment.

FIG. 1 is a block diagram illustrating a configuration of an apparatus according to an example embodiment. The apparatus according to the example embodiment may include a camera module 100 and a processor 200. The camera module 100 of FIG. 1 may include a movement sensor 110 and an image sensor 120.

The movement sensor 110 may continuously output pieces of movement information mov. The pieces of movement information may indicate movements of the camera module 100. The pieces of movement information may be output through a serial peripheral interface (SPI), an inter-integrated circuit (I2C) interface, or an inter-integrated circuit (I3C) interface. The movement sensor 110 may also periodically output the pieces of movement information mov. Alternatively, the movement sensor 110 may periodically detect movements to generate the pieces of movement information, and then, may simultaneously output the generated pieces of movement information (mov) to the image sensor 120. The movement sensor 110 may output the pieces of movement information (mov) in response to a command or request output from the image sensor 120. The movement sensor 110 may also include a gyroscope sensor or an acceleration sensor. The gyroscope sensor or the acceleration sensor may be an advanced sensor used for optical image stabilization (OIS), and may also be a dedicated sensor calibrated for imaging. The movement sensor 110 may be disposed adjacent to the image sensor 120 of the camera module 100, which may allow the image sensor 120 to properly reflect movement of the camera module 100.

The image sensor 120 may obtain image information by converting received light into an electrical signal, may receive pieces of movement information from the movement sensor 110, and may output data including the obtained image information and the received pieces of movement information. The image sensor 120 may have a single port outputting the data. Movement information output together with the image information may also be selected from the pieces of movement information received by the image sensor 120, based on an exposure time of pixels for image acquisition. The data may also additionally include first time information regarding a time at which the image sensor 120 obtains the image information, and second time information regarding a time at which the movement information is received. The first time information and the second time information may be detected using the same time information, for example, the same clock signal or a signal output by a single counter.

The data may be output through a mobile industry processor interface (MIPI). In this case, the movement information, the first time information or the second time information may be output together with the image information in an embedded data format or general data format of the MIPI.

When the image sensor 120 selects and outputs pieces of movement information, the second time information may include times when the pieces of movement information are respectively input. Information regarding the times when the pieces of movement information are input may be transmitted from the image sensor 120 to the processor 200 while being added to each of the pieces of movement information.

The image sensor 120 may obtain the first time information directly using a control signal controlling operations of the pixels. The control signal may include at least one of a shutter control signal controlling exposure of the pixels and a read signal reading information regarding an image obtained by the pixels.

The processor 200 may receive the data from the camera module 100, and may correct the image using the selected pieces of movement information.

For example, the image information and the pieces of movement information may be output through a single port. In this case, the single port may be an MIPI port. Thus, a hardware configuration of the apparatus may be simplified, and furthermore, the image sensor 120 may output the most accurate movement information to the processor 200.

According to an example embodiment, the image sensor 120 may also receive movement information from the movement sensor 110, may synchronize the received movement information with an exposure time of the pixels in the image sensor 120, and may provide the movement information to an external source. As described above, the movement sensor 110 may periodically output the movement information. For example, a time interval at which pieces of movement information are output by the movement sensor 110 may be constant. However, an exposure time of the pixels of the image sensor 120 may vary, depending on surroundings. Thus, it may be difficult to identify an exact exposure time of the pixels of the image sensor 120, for example, an exposure start time and an exposure end time, from outside of the image sensor 120.

As a result, according to an example embodiment, the image sensor 120 as a main component may store movement information output by the movement sensor 110, such as the gyroscope sensor or the acceleration sensor, together with a time stamp, and may provide the stored movement information to an external processor, for example, the processor 200, at an identified exact exposure time in frame units. The movement sensor 110 and the image sensor 120 may be connected to each other through an SPI, an I2C interface, or an I3C interface, and the image sensor 120 and the external processor may be connected to each other through an MIPI. In this case, the movement information may be output together with image data in an embedded data format or general data format of the MIPI. For example, the image data and the movement information may be output through a single port.

This may allow movement information most accurately synchronized with an exposure time of the image sensor 120 to be transmitted to an external source, and a movement compensation function such as an OIS function may be implemented without changing a chip interface or a module connector. In other words, inter-chip timing mismatch that may occur when a separate chip detecting movement information is used may be prevented, and information regarding movements of the camera module 100 at an accurate exposure time of the pixels of the image sensor 120 may be transmitted to the external processor without changing a module connector or a chip pad.

Figure 2:
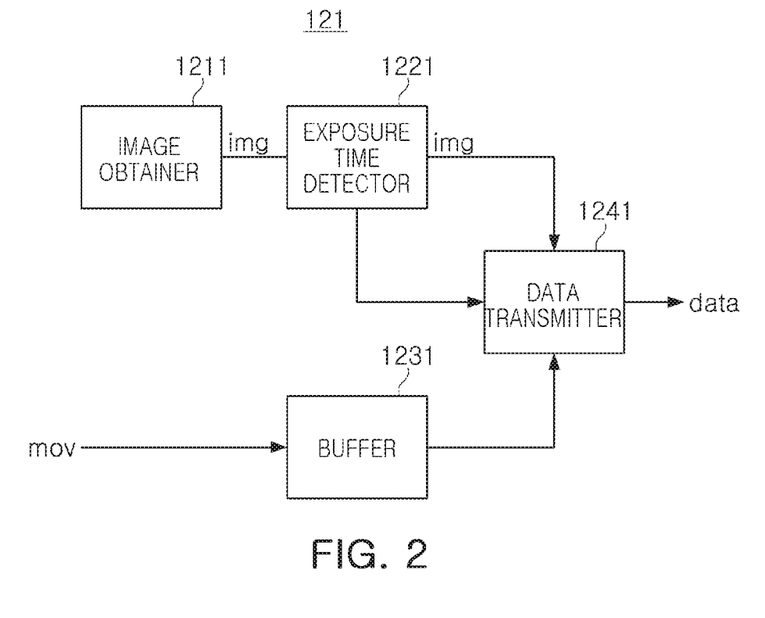
FIG. 2 is a block diagram illustrating a configuration of an image sensor according to an example embodiment.

FIG. 2 is a block diagram illustrating a configuration of an image sensor according to an example embodiment. An image sensor 121 according to an example embodiment may include an image obtainer 1211, an exposure time detector 1221, a buffer 1231, and a data transmitter 1241.

The image obtainer 1211 may output an image signal. The image obtainer 1211 may include a pixel array including a plurality of pixels. The image signal img output from the image obtainer 1211 may include a plurality of image frames.

The exposure time detector 1221 may detect an exposure time of the pixels. The exposure time detector 1221 may also provide the detected exposure time to the data transmitter 1241. The exposure time may include a time at which exposure of the pixels is complete. The exposure time detector 1221 may detect the exposure time directly using a control signal controlling the pixels. For example, the control signal may control exposure of pixels included in a single column of the pixel array, and depending on a state of the control signal, the pixels may remain in a shutter close or shutter open state. Thus, the exposure time detector 1221 may detect a shutter close or shutter open time by detecting a time at which the state of the control signal changes.

The buffer 1231 may store each of pieces of movement information together with a time stamp. The time stamp may be information regarding a time at which each of the pieces of movement information mov is received. The time stamp may also be added to all or a portion of the pieces of movement information mov.

The data transmitter 1241 may output data including an image signal img and movement information mov corresponding to an exposure time. For example, the data transmitter 1241 may select at least one piece of movement information mov indicating movements of the image sensor 121, using an exposure time received from the exposure time detector 1221, for example, a shutter close or shutter open time, a time stamp for movement information mov, and the pieces of movement information mov stored in the buffer 1231, and may output the selected at least one piece of movement information together with an image signal. The selected at least one piece of movement information may include movement information received at a time closest to the shutter close time.

Further, in order to obtain the exposure time and the time stamp stored together with the movement information, the image sensor 121 may further include a counter functioning as a global clock.

The exposure time detector 1221 and the data transmitter 1241 may also be implemented by software. For example, the image sensor 121 may include a processor to function as the exposure time detector 1221 and the data transmitter 1241, using software.

Figure 3:
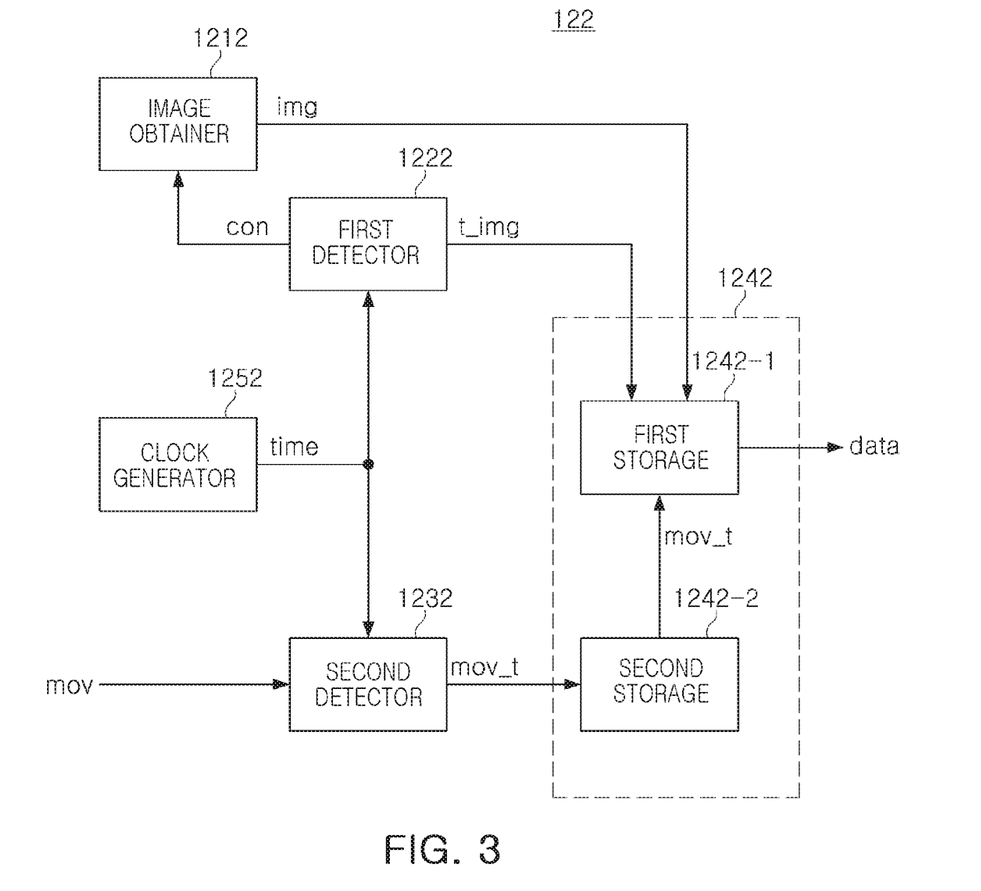
FIG. 3 is a block diagram illustrating a configuration of an image sensor according to an example embodiment.

FIG. 3 is a block diagram illustrating a configuration of an image sensor according to an example embodiment. An image sensor 122 may include an image obtainer 1212, a first detector 1222, a second detector 1232, an output interface 1242, and a clock generator 1252. The output interface 1242 may include a first storage 1242-1 and a second storage 1242-2.

The image obtainer 1212 may generate image information img by converting received light into an electrical signal. The image obtainer 1212 may generate image information img, in response to receiving a control signal con from the first detector 1222. In more detail, the image obtainer 1212 may include a pixel array including a plurality of pixels arranged in a matrix configured to output a voltage according to an amount of received light. In this case, the control signal con may include shutter control signals or read signals for respective rows of the pixel array. For example, the pixels included in the respective rows of the pixel array may receive light, depending on a state of a corresponding shutter control signal. For example, the pixels may remain in a shutter open or shutter close state, depending on the state of the shutter control signal. The pixels included in the respective rows of the pixel array may also output a voltage according to an amount of light received depending on a state of a corresponding lead signal.

The first detector 1222 may output the control signal con to the image obtainer 1212, may receive information regarding the current time, and may detect information regarding a time at which the image obtainer 1212 generates the image information img using the received control signal con and information regarding the current time. For example, the first detector 1222 may detect the information regarding the current time input when the state of the control signal con changes as the information regarding the time at which the image obtainer 1212 generates the image information img. The information regarding the time at which the image obtainer 1212 generates the image information img may include at least one of a shutter open time, a shutter close time, and a read end time for a first row of the pixel array, and of a shutter open time, a shutter close time, and a read end time for a final row of the pixel array.

The second detector 1232 may receive pieces of movement information mov and the information regarding the current time, and may detect the information regarding the current time input when the pieces of movement information mov are received as time information related to the pieces of movement information mov.

For example, the second detector 1232 may output movement information mov_t to which the information regarding the current time input when each of the pieces of movement information mov is received is added as a time stamp, with respect to all of the received pieces of movement information mov. Alternatively, the second detector 1232 may output movement information mov_t to which the information regarding the current time input when each of the pieces of movement information mov is received is added as a time stamp, with respect to only a portion of the received pieces of movement information mov.

Each of the pieces of movement information mov may be periodically input, or the pieces of movement information mov may be input in a plurality of groups. For example, in response to a signal output by an image sensor, a movement sensor may simultaneously output pieces of movement information mov to the image sensor. When the pieces of movement information mov are simultaneously input to the movement sensor, a time stamp for the latest movement information mov among the pieces of movement information mov may be generated using the information regarding the current time, and a time stamp for the remainder thereof may be generated using the time stamp for the latest movement information mov and a movement detect period of the movement sensor.

The output interface 1242 may receive and store image information img received from the image obtainer 1212, may receive and store time information t_img related to the image information img received from the first detector 1222, may receive and store pieces of movement information mov_t to which time stamps are added from the second detector 1232, and may output the image information img received from the image obtainer 1212, the time information received from the first detector 12222 t_img, and the pieces of movement information mov_t received from the second detector 1232 to which the time stamps are added. Also, the output interface 1242 may select a portion of the pieces of movement information mov_t received from the second detector 1232 to which the time stamps are added using the time information t_img, and may output the selected portion of the pieces of movement information mov_t.

The second storage 1242-2 may store the pieces of movement information mov_t to which the time stamps are added. The second storage 1242-2 as a first-in first-out (FIFO) memory may be a static random access memory (SRAM).

The first storage 1242-1 may receive and store image information img received from the image obtainer 1212, may receive and store time information t_img related to the image information img received from the first detector 1222. The first storage 1242-1 may also store pieces of movement information mov_t selected from the pieces of movement information mov_t to which the time stamps are added based on the time information t_img related to the image information img, and may output the stored selected pieces of movement information mov_t. For example, when a processor reads information stored in the first storage 1242-1, the stored information may be output as data. The first storage 1242-1 may be an SRAM.

The clock generator 1252 may output the information regarding the current time to the first and second detectors 1222 and 1232. The clock generator 1252 may be implemented as an oscillator or a counter.

Figure 4A:
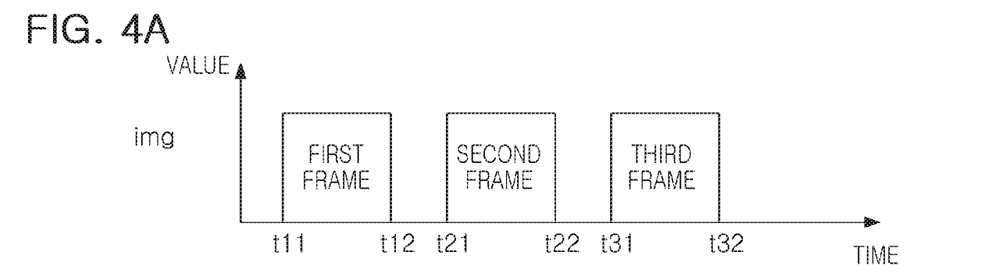
FIGS. 4A, 4B, and 4C are diagrams illustrating operations of an image sensor according to an example embodiment.
Figure 4B:
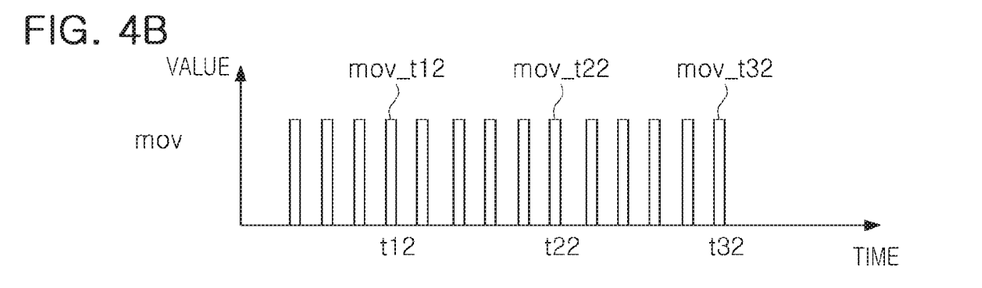
Figure 4C:
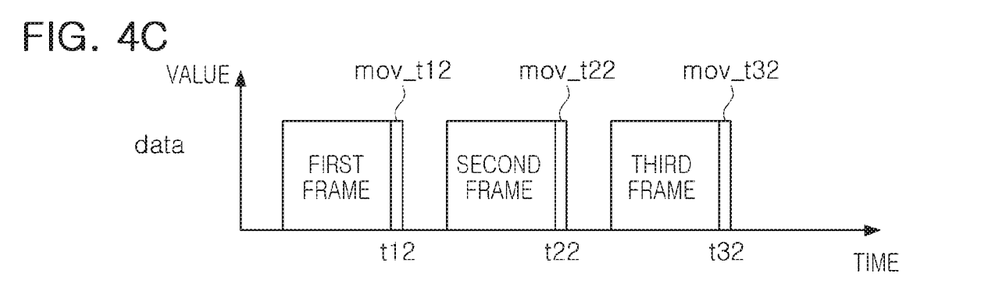

FIGS. 4A, 4B, and 4C are diagrams illustrating operations of an image sensor according to an example embodiment.

As illustrated in FIG. 1, the camera module 100 may have the movement sensor 110 and the image sensor 120 embedded together therein. The movement sensor 110 may be a gyroscope sensor, and in this case, a bidirectional (output) port of the gyroscope sensor may be connected to the image sensor 120.

As described above, the image sensor 120 may have an additional counter provided therein to function as a global clock.

As time stamps, global clocks at times t11, t21, and t31 when the pixels of the image sensor 120 start to be exposed and at times t12, t22, and t32 when the exposure of the pixels is completed may be stored in image frames, for example, first to third image frames, obtained by the image sensor 120.

The image sensor 120 may store pieces of movement information in a memory, for example, the buffer 1231, and may store a global clock at a time at which each of the pieces of movement information is received as a time stamp. In an example, the time at which each of the pieces of movement information is received may be a value indicating that each movement information is information regarding movements of the camera module 100 at any point of time. For example, a time stamp of movement information mov_t12 may be t12, a time stamp of movement information mov_t22 may be t22, and a time stamp of the movement information mov_t32 may be t32.

After a single image frame is captured and then image data on the single image frame is output to an external source, the data transmitter 1241 of the image sensor 120 may output a time stamp together with the captured single frame. For example, when the data transmitter 1241 outputs image data on a first frame, the data transmitter 1241 may output time stamps t11 and t12 together with the image data. A time stamp may be output as a footer, using an embedded data format of an MIPI.

Subsequently, the data transmitter 1241 may output movement information corresponding to the current frame, together with a time stamp for the movement information, at an idle time before outputting image data on a next frame. The movement information corresponding to the current frame may be selected using the time stamp. For example, when the current frame is the first frame, the movement information mov_t12 having a time stamp t12 may be selected and output. Alternatively, when the current frame is the first frame, pieces of movement information having a time stamp greater than or equal to the time stamp t12 and less than the time stamp t21 may be selected and output. In each case, the data transmitter 1241 may output at least one piece of movement information selected before outputting image data on the first frame and image data on a second frame. The selected at least one piece of movement information may be output as a footer, using the embedded data format of the MIPI. In addition to the selected at least one piece of movement information, the time stamps t11 and t12 for the first frame and a time stamp for the selected at least one piece of movement information may be transmitted.

Figure 5A:
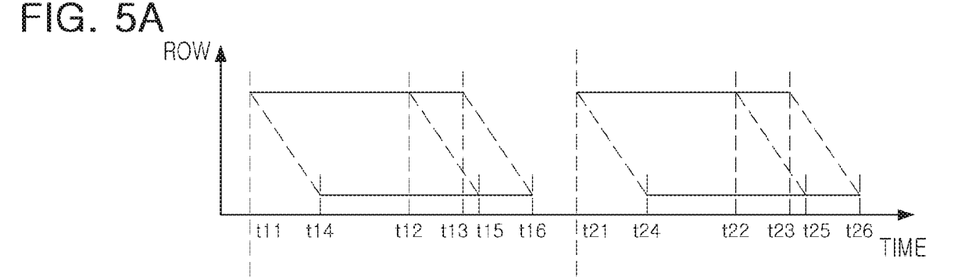
FIGS. 5A, 5B, and 5C are diagrams illustrating operations of an image sensor according to an example embodiment.
Figure 5B:
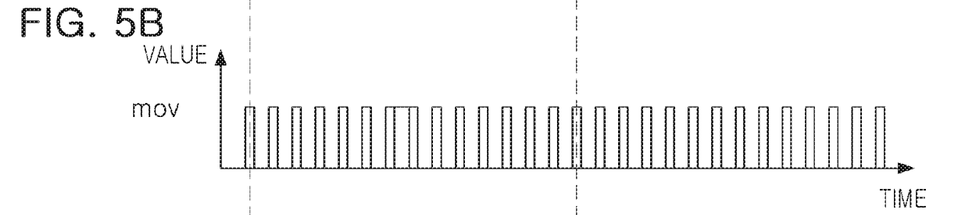
Figure 5C:
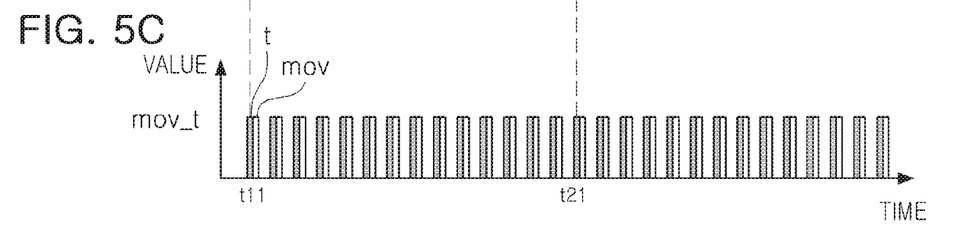

FIGS. 5A, 5B, and 5C are diagrams illustrating operations of an image sensor according to an example embodiment.

As described above, the image obtainer 1211 of the image sensor 121 of FIG. 2 and the image obtainer 1212 of the image sensor 122 of FIG. 3 may include a plurality of pixels arranged in a matrix.

FIG. 5A is a diagram illustrating operations of the pixels.

First, a process of obtaining a first frame of image information is described as follows.

At a time t11, pixels of a first row of the pixels may start to be exposed. For example, the pixels of the first row may remain in a shutter open state. At a time t12, the pixels of the first row of the pixels may be completely exposed. For example, the pixels of the first row may remain in a shutter close state. At a time t13, a read operation for the pixels of the first row of the pixels may be completed. At a time t14, pixels of a final row of the pixels may start to be exposed. For example, the pixels of the final row may remain in a shutter open state. At a time t15, the pixels of the final row of the pixels may be completely exposed. For example, the pixels of the final row may remain in a shutter close state. At a time t16, a read operation for the pixels of the final row of the pixels may be completed. The operations of the pixels may be controlled by a control signal (a shutter control signal or a read signal) applied to the image obtainer 1211 or 1212 illustrated in FIGS. 2 and 3.

A process of obtaining a second frame of the image information may be similar to the process of obtaining the first frame.

In this case, as time information related to the obtaining of the image information, the above-mentioned times t11 to t16 may be detected.

FIG. 5B illustrates pieces of movement information detected by an image sensor, and FIG. 5C illustrates pieces of movement information to which time stamps t are added. FIG. 5C illustrates all of the pieces of movement information to which the time stamps t are added, but the time stamps t may also be added to only a portion of the pieces of movement information mov.

The image sensor may select and output the pieces of movement information, or a portion of the pieces of movement information to which the time stamps t are added, using time information related to the obtaining of the image information. For example, when the image sensor outputs the first frame of the image information, the image sensor may output pieces of movement information having a time stamp greater than or equal to the time stamp t11 and less than the time stamp t21, or pieces of movement information to which the time stamps t are added.

Figure 6:
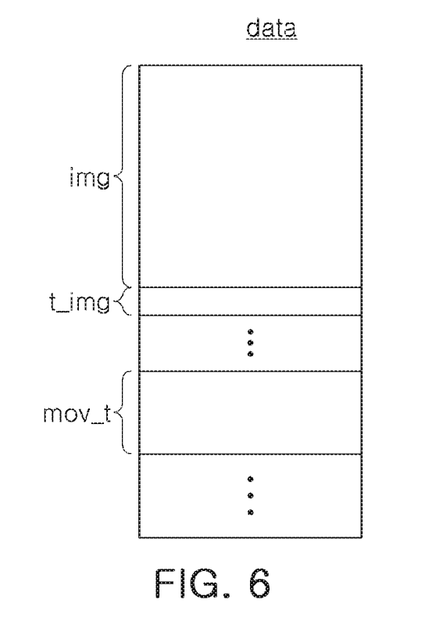
FIG. 6 is a diagram illustrating a configuration of data output by an image sensor according to an example embodiment.

FIG. 6 is a diagram illustrating a configuration of data output by an image sensor according to an example embodiment.

Data output by the image sensor according to an example embodiment may include image information img, time information t_img related to obtaining of the image information img, and movement information mov_t selected on the basis of the time information t_img, and having a time stamp added thereto.

The time information t_img related to the obtaining of the image information img may be detected directly using a control signal controlling pixels of the image sensor, and may include a shutter open time, a shutter close time, and a read end time of pixels of a first row of the pixels and a shutter open time, a shutter close time, and a read end time of pixels of a final of the pixels, as described above.

The selected movement information mov_t may be the whole or a portion of pieces of movement information mov_t received by the image sensor between a shutter open time of pixels of a first row on the current frame and a shutter open time of pixels of a first row on a frame subsequent to the current frame.

As described above, a time stamp may be added to only a portion of pieces of movement information mov_t included in the data, and a time stamp may also be added to all of the pieces of movement information mov_t included in the data.

Further, the data may also include a header which includes the image information img, the time information t_img related to the obtaining of the image information img, and information regarding whether the time information t_img is positioned in any portion of the data.

Figure 7:
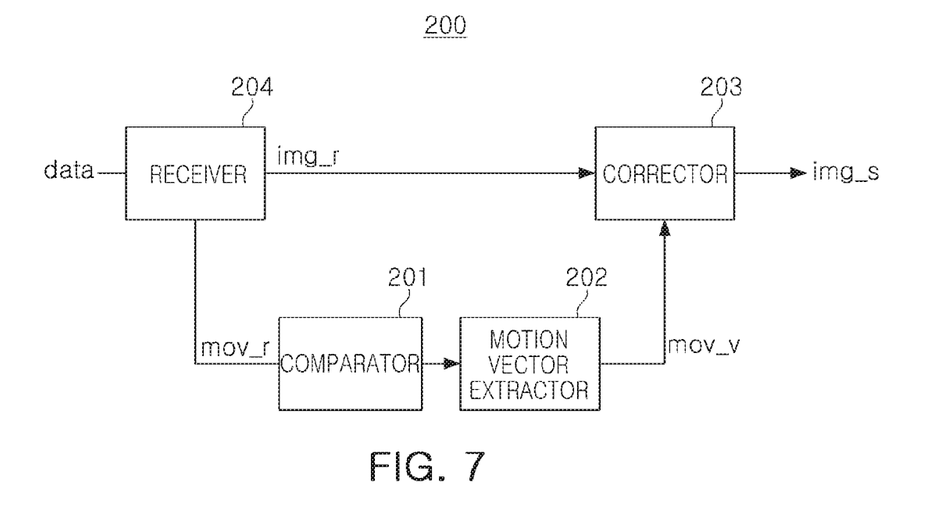
FIG. 7 is a block diagram illustrating a configuration of a processor of an apparatus according to an example embodiment.

FIG. 7 is a block diagram illustrating a configuration of a processor of an apparatus according to an example embodiment. A processor 200 may include a comparator 201, a motion vector extractor 202, a corrector 203, and an receiver 204.

Figure 8A:
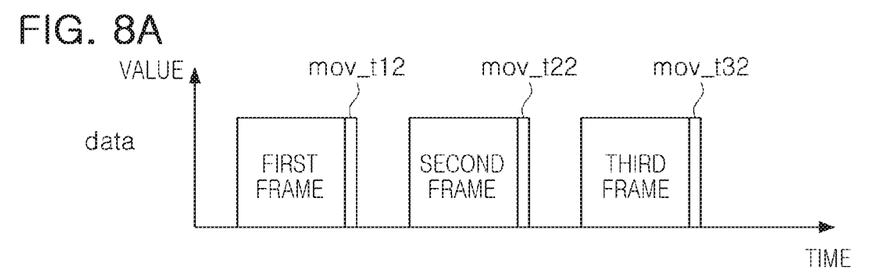
FIGS. 8A, 8B, and 8C are diagrams illustrating operations of a processor of an apparatus according to an example embodiment.
Figure 8B:
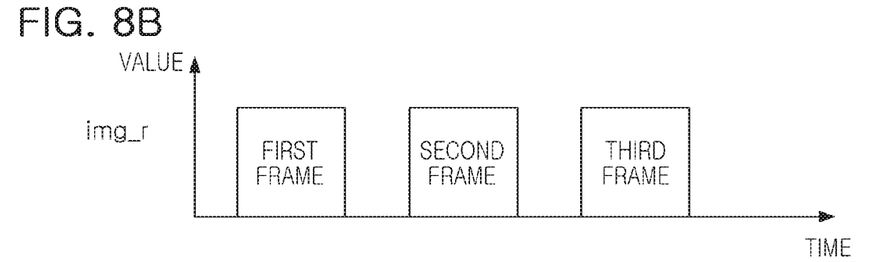
Figure 8C:
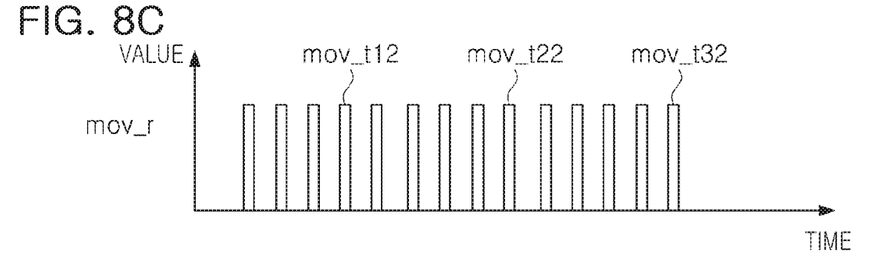

FIGS. 8A, 8B, and 8C are diagrams illustrating operations of a processor of an apparatus according to an example embodiment. FIG. 8A illustrates data received by the processor 200. FIG. 8B illustrates received image information img_r output by the receiver 204. FIG. 8C illustrates received movement information mov_r output by the receiver 204.

Referring to FIGS. 7 and 8, the operations of the processor of the apparatus according to an example embodiment will be described below.

The receiver 204 may receive data, may output image information of the data as received image information img_r, and may output movement information of the data as received movement information mov_r. The receiver 204 may extract the image information and the movement information from the data, using details of a header of the data.

The comparator 201 may compare a time stamp for the received movement information mov_r with a time stamp for the received image information img_r, and may select and output movement information to be used when the motion vector extractor 202 extracts a motion vector mov_v.

Subsequently, the motion vector extractor 202 may extract a motion vector mov_v, using the selected movement information.

Next, the corrector 203 may correct image data of a first frame, using the extracted motion vector mov_v.

Such an operation may continue to be performed for a second frame and a third frame.

The comparator 201, the motion vector extractor 202, the corrector 203, and the receiver 204 may also be implemented by software. For example, the processor 200 may be implemented as a single application processor (AP), and the single AP may function as the comparator 201, the motion vector extractor 202, the corrector 203, and the receiver 204, using software.

The received movement information mov_r may also include only a portion of pieces of movement information received by an image sensor.

Each of pieces of received movement information mov_r or a portion thereof may have a time stamp added thereto.

Figure 9:
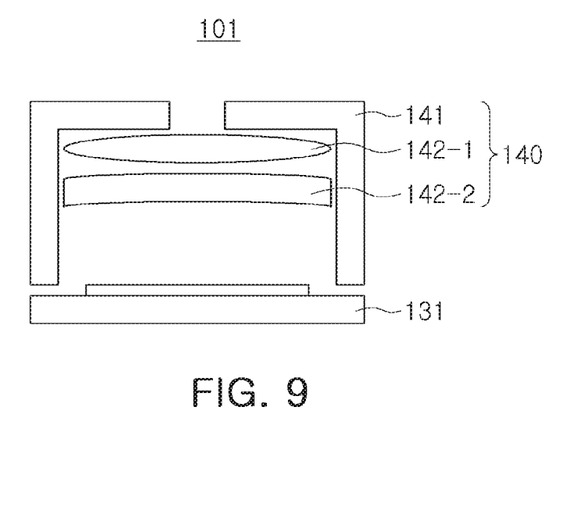
FIG. 9 is a diagram illustrating a configuration of a camera module according to an example embodiment.

FIG. 9 is a diagram illustrating a configuration of a camera module according to an example embodiment. A camera module 101 may include an optical unit 140 and an image sensor 131.

The optical unit 140 may include a cover 141 and a plurality of lenses 142-1 and 142-2. The lenses 142-1 and 142-2 may move within the cover 141. The cover 141 and the image sensor 131 may also be coupled to each other in various manners.

The image sensor 131 may output image information, depending on an amount of light received through the optical unit 140. The image sensor 131 may include a circuit and a pixel array stacked on a printed circuit board (PCB).

Further, a movement sensor may be attached to a portion of the camera module 101. For example, the movement sensor may be attached to the image sensor 131, and may also be attached to the cover 141.

Figure 10:
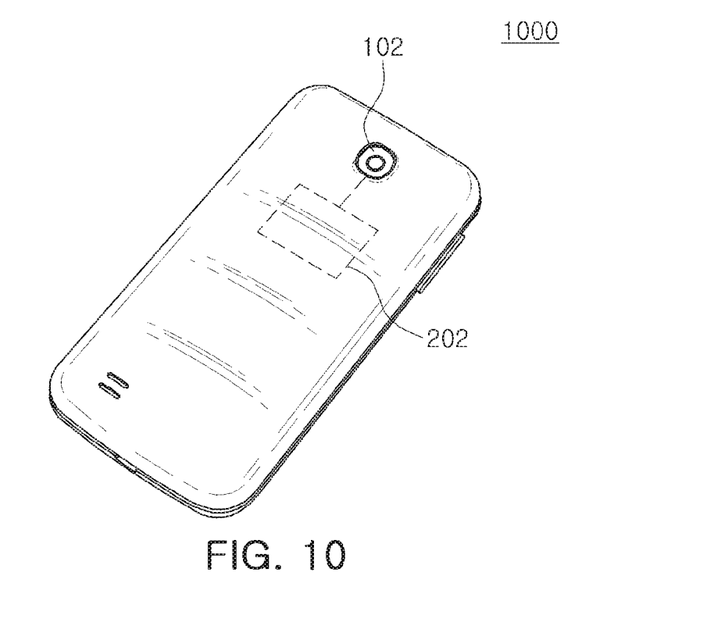
FIG. 10 is a block diagram illustrating a configuration of an apparatus according to an example embodiment.

FIG. 10 is a block diagram illustrating a configuration of an apparatus according to an example embodiment. An apparatus 1000 according to an example embodiment may include a camera module 102 and a processor 202.

The camera module 102 may include a movement sensor and an image sensor. A configuration and operations of the image sensor included in the camera module 102 may be the same as those illustrated in FIGS. 2, 3, 4A, 4B, 4C, 5A, 5B, 5C and 6.

A configuration and operations of the processor 202 may be the same as those illustrated in FIGS. 7, 8A, 8B and 8C.

FIG. 10 illustrates a mobile device as an apparatus according to an example embodiment, but the apparatus according to an example embodiment may be provided as various types of device, such as a drone, a digital camera, a wearable camera, or an automobile, to which a camera module may be attached.

According to an example embodiment, an image sensor may directly receive movement information, and may buffer and output the received movement information. The image sensor may, for example, group, the movement information, based on an exposure time of pixels of the image sensor. The image sensor may also transmit the movement information to a processor, using an MIPI of the image sensor, other than a separate interface for sending movement information. Further, the image sensor may include a counter functioning as a global clock, and may synchronize image information with movement information by adding time stamps to the image information and the movement information, using the global clock. The processor may provide a higher quality image by using movement information packed in frame units to correct image information of a corresponding frame, with consideration of an exposure time.

As set forth above, according to example embodiments, an image sensor, a camera module, and an apparatus may provide a higher quality image.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While exemplary embodiments have been shown and described above, it will be apparent to those skilled in the art that modifications and variations could be made without departing from the scope of the present disclosure.

What is claimed is:

1. An image sensor comprising:
   an image obtainer configured to generate image information by converting received light into an electrical signal;
   a first detector configured to detect first time information regarding a first time at which the image obtainer acquires the image information;
   a second detector configured to receive a plurality of pieces of movement information indicating movements of the image obtainer, detect second time information regarding a second time at which at least one piece of movement information among the plurality of pieces of movement information is received, output the second time information detected at the point in time at which each of the plurality of pieces of movement information is received, as a time stamp, and output time-stamped movement information based on the plurality of pieces of movement information and the second time information;
   an output interface comprising a single port, wherein the output interface is configured to receive the image information, the first time information and the time-stamped movement information, and output, to a processor through the single port, the image information and the time-stamped movement information that corresponds to the first time information; and
   an input interface configured to receive the plurality of pieces of movement information from a motion sensor,
   wherein the image sensor is interposed between the motion sensor and the processor, and
   wherein the time-stamped movement information output to the processor is the movement information synchronized by the output interface to an exposure time of a plurality of pixels included in the image sensor.

2. The image sensor of claim 1, further comprising a clock generator configured to output information regarding a current time to the first detector and the second detector,
   wherein the first detector is further configured to detect the first time information using the information regarding the current time, and
   wherein the second detector is further configured to detect the second time information using the information regarding the current time.

3. The image sensor of claim 2, wherein the first detector is further configured to output a control signal controlling operations of the image obtainer, and determine the first time information based on the current time input when a state of the control signal changes.

4. The image sensor of claim 3, wherein the image obtainer comprises a pixel array having the plurality of pixels arranged in a matrix, and the control signal comprises at least one among shutter control signals and read signals for respective rows of the pixel array.

5. The image sensor of claim 4, wherein the first time information comprises at least one among a shutter open time, a shutter close time, and a read end time for a first row of the pixel array; and at least one among a shutter open time, a shutter close time, and a read end time for a final row of the pixel array.

6. The image sensor of claim 2, wherein the second detector is further configured to determine the second time information based on the current time input when the at least one piece of movement information is received, determine a corresponding second time at which each of the plurality of pieces of movement information are received, respectively add the determined time to each of the plurality of pieces of movement information, and output the plurality of pieces of movement information.

7. The image sensor of claim 1, wherein the output interface is further configured to:
   store the image information, the first time information, the plurality of pieces of movement information, and the second time information;

select the output movement information based on the first time information; and output the image information, the first time information, the selected output movement information, and the second time information regarding the selected output movement information.

8. The image sensor of claim 7, wherein the output interface comprises:
   a first storage configured to store the plurality of pieces of movement information and the second time information corresponding to each of the plurality of pieces of movement information; and
   a second storage configured to receive and store the image information from the image obtainer, the first time information from the first detector, the selected output movement information and the second time information for the selected output movement information from the first storage, and output the image information, the first time information, the selected output movement information, and the information regarding the selected output movement information of the second time information.

9. The image sensor of claim 1, wherein the image sensor is configured to receive the plurality of pieces of movement information through one among a serial peripheral interface, an inter-integrated circuit (I2C) interface, and an inter-integrated circuit (I3C) interface, and
   the single port is a mobile industry processor interface (MIPI).

10. The image sensor of claim 9, wherein the image sensor is configured to output the first time information, the at least one piece of movement information, and the second time information in one among an embedded data format and a general data format.

11. A camera module comprising:
   an optical unit including a plurality of lenses;
   a movement sensor configured to detect movement and generate a plurality of pieces of movement information based on the detected movement; and
   an image sensor configured to generate image information by converting light received through the optical unit into an electrical signal, receive the plurality of pieces of movement information from the movement sensor; and output, through a single port to a processor, the image information, first time information, information regarding a first time at which the image information is obtained, at least one piece of movement information among the plurality of pieces of movement information, and second time information regarding a second time at which the at least one piece of movement information is received,
   wherein the image sensor is interposed between the movement sensor and the processor, and
   wherein the at least one piece of movement information output to the processor is the movement information synchronized by the image sensor to an exposure time of a plurality of pixels included in the image sensor.

12. The camera module of claim 11, wherein the image sensor comprises:
   a clock generator configured to output information regarding a current time;
   an image obtainer configured to acquire the image information based on a plurality of control signals;
   a first detector configured to output the plurality of control signals, and detect the current time input when states of the plurality of control signals change as a first time information; and
   a second detector configured to receive the plurality of pieces of movement information and the information regarding the current time, detect the current time input when the at least one piece of movement information is received as a second time information, add the second time information to the at least one piece of movement information, and output the at least one piece of movement information.

13. The camera module of claim 12, wherein the image obtainer comprises a pixel array having the plurality of pixels arranged in a matrix, and the plurality of control signals comprise at least one among shutter control signals and read signals for respective rows of the pixel array.

14. The camera module of claim 12, wherein the image sensor comprises an output interface configured to store the image information, the first time information, the plurality of pieces of movement information, and the second time information; select output movement information corresponding to the first time information from among the plurality of pieces of movement information based on the first time information and the second time information; and output the image information, the first time information, the selected output movement information, and the second time information regarding the selected output movement information.

15. The camera module of claim 14, wherein the output interface comprises:
   a first storage configured to store the plurality of pieces of movement information and the second time information for each of the plurality of pieces of movement information; and
   a second storage configured to receive and store the image information from the image obtainer, the first time information from the first detector, the selected output movement information and the second time information for the selected output movement information from the first storage; and output the image information, the first time information, the selected output movement information, and the second time information for the selected output movement information.

16. The camera module of claim 11, wherein the image sensor is further configured to receive the plurality of pieces of movement information from the movement sensor through one among a serial peripheral interface (SPI), an I2C interface, and an I3C interface; and output the image information, the first time information, the at least one piece of movement information among the plurality of pieces of movement information, and the second time information through a mobile industry processor interface (MIPI).

17. The camera module of claim 16, wherein the image sensor is further configured to output the first time information, the at least one piece of movement information, and the second time information in one among an embedded data format and a general data format.

18. The camera module of claim 11, wherein the movement sensor is directly connected to the processor through the image sensor.

* * * * *